United States Patent
Yu et al.

(10) Patent No.: US 11,146,346 B2
(45) Date of Patent: Oct. 12, 2021

(54) TRANSMITTING A MESSAGE IN RESPONSE TO RECEIVING A MESSAGE

(71) Applicant: Motorola Mobility LLC, Chicago, IL (US)

(72) Inventors: Xiaodong Yu, Beijing (CN); Haipeng Lei, Beijing (CN); Lianhai Wu, Beijing (CN); Zhi Yan, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/499,803

(22) PCT Filed: Mar. 29, 2017

(86) PCT No.: PCT/CN2017/078578
§ 371 (c)(1),
(2) Date: Sep. 30, 2019

(87) PCT Pub. No.: WO2018/176264
PCT Pub. Date: Oct. 4, 2018

(65) Prior Publication Data
US 2020/0106539 A1    Apr. 2, 2020

(51) Int. Cl.
*H04H 20/67* (2008.01)
*H04W 4/70* (2018.01)
(Continued)

(52) U.S. Cl.
CPC ............ *H04H 20/67* (2013.01); *G08C 19/28* (2013.01); *H04W 4/70* (2018.02); *H04W 4/80* (2018.02);
(Continued)

(58) Field of Classification Search
CPC .......... H04H 20/67; H04W 4/70; H04W 4/80; H04W 36/00; H04W 72/0413;
(Continued)

(56) References Cited

U.S. PATENT DOCUMENTS

2008/0299973 A1* 12/2008 Sayeedi ............ H04W 36/0055
455/436
2009/0233604 A1* 9/2009 Sayeedi ................ H04W 36/38
455/436
(Continued)

FOREIGN PATENT DOCUMENTS

CN          104954976 A    9/2015
CN          106455086 A    2/2017
(Continued)

OTHER PUBLICATIONS

PCT/CN2017/078578, Notification of Transmittal of the International Search Report and the Written Opinion of the International Searching Authority, or the Declaration, dated Dec. 22, 2017.
(Continued)

*Primary Examiner* — Shaima Q Aminzay
(74) *Attorney, Agent, or Firm* — Kunzler Bean & Adamson (57) ABSTRACT

Apparatuses, methods, and systems are disclosed for transmitting a message in response to receiving a message. One apparatus (300) includes a receiver (312) that receives (602) a second message from a second remote unit (200). The second message is transmitted from the second remote unit in response to the second remote unit receiving a first message from a first remote unit. The apparatus (300) includes a transmitter (310) that transmits (604) a third message corresponding to the first message in response to receiving the second message.

20 Claims, 8 Drawing Sheets

(51) Int. Cl.
| | |
|---|---|
| *H04W 4/80* | (2018.01) |
| *G08C 19/28* | (2006.01) |
| *H04W 36/00* | (2009.01) |
| *H04W 72/04* | (2009.01) |
| *H04W 72/12* | (2009.01) |
| *H04W 84/02* | (2009.01) |

(52) U.S. Cl.
CPC ....... *H04W 36/00* (2013.01); *H04W 72/0413* (2013.01); *H04W 72/1278* (2013.01); *H04W 84/025* (2013.01)

(58) Field of Classification Search
CPC ........... H04W 72/1278; H04W 84/025; H04W 76/00; H04W 88/08; H04W 8/24; H04W 36/0055; H04W 88/02; H04W 12/06; H04W 24/02; H04W 48/16; G08C 19/28
USPC ........................................................ 455/503
See application file for complete search history.

(56) References Cited

U.S. PATENT DOCUMENTS

2014/0328329 A1* 11/2014 Novlan ............. H04W 56/0015
370/336
2019/0239273 A1* 8/2019 Berggren .............. H04W 76/11

FOREIGN PATENT DOCUMENTS

| WO | 2016141591 A1 | 9/2016 |
|---|---|---|
| WO | 2017003161 A1 | 1/2017 |

OTHER PUBLICATIONS

3GPP, "3rd Generation Partnership Project; Technical Specification Group Radio Access Network; Study on further enhancements to LTE Device to Device (D2D), User Equipment (UE) to network relays for Internet of Things (IoT) and wearables; (Release 14)", 3GPP TR 36.746 V0.3.0, Oct. 2016, pp. 1-11.

Ericsson, "LS to RAN1 on feMBMS/Unicast cell definition", 3GPP TSG-RAN WG2 Meeting #97 R2-1702175, Feb. 13-17, 2017, pp. 1-2.

3GPP, "3rd Generation Partnership Project; Technical Specification Group Radio Access Network; Study on LTE Device to Device Proximity Services; Radio Aspects (Release 12)", 3GPP TR 36.843 V12.0.1, Mar. 2014, pp. 1-50.

Huawei et al., "Revised SI: Further Enhancements LTE Device to Device, UE to Network Relays for IoT and Wearables", 3GPP TSG RAN Meeting #73 RP-161839, Sep. 19-22, 2016, pp. 1-8.

* cited by examiner

TRANSMITTING A MESSAGE IN RESPONSE TO RECEIVING A MESSAGE

FIELD

The subject matter disclosed herein relates generally to wireless communications and more particularly relates to transmitting a message in response to receiving a message.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, a high carrier frequency (e.g., >6 GHz) may be used, such as millimeter wave. In some networks, sidelink may be used for proximity services ("ProSe") direct communication and ProSe direct discovery between UEs without using an eNB. In certain networks, Prose communication may operate inefficiently.

In various networks, for DL transmission, an eNB may send DCI in PDCCH and the associated data in PDSCH in the same subframe. A UE may decode the data and determine whether the data is correct. If the data is not correct, the UE may generate and send a NACK to the eNB. When the NACK is received by the eNB, the eNB may retransmit the data in asynchronized HARQ mode until an ACK is received.

In some networks, for UL grant-based transmission, a UE with data to send may send an SR and wait for an UL grant before transmitting the data packet. When the UL grant is decoded, the data may be transmitted in the scheduled subframe. The eNB may decode the data and determine whether the data is correct. If the data is not correct, the eNB may generate and send a NACK to the UE. When the NACK is received at the UE side, the data may be retransmitted in synchronized HARQ mode. In certain configurations, such as when using Prose communication, the above described DL transmission and UL transmission methods may not function properly.

BRIEF SUMMARY

Apparatuses for transmitting a message in response to receiving a message are disclosed. Methods and systems also perform the functions of the apparatus. In one embodiment, the apparatus includes a receiver that receives a second message from a second remote unit. In such an embodiment, the second message is transmitted from the second remote unit in response to the second remote unit receiving a first message from a first remote unit. In some embodiments, the apparatus includes a transmitter that transmits a third message corresponding to the first message in response to receiving the second message.

In one embodiment, the transmitter transmits the third message to the second remote unit, and the second remote unit transmits the third message to the first remote unit. In a further embodiment, the transmitter transmits the third message to the first remote unit. In certain embodiments, the second message includes a scheduling request, measurement information, or a combination thereof, and the third message includes control signaling to schedule sidelink communication. In various embodiments, the second message includes data and the third message includes feedback corresponding to the data. In some embodiments, the second message includes a scheduling request, measurement information, or some combination thereof. In one embodiment, the scheduling request includes a traffic type, a traffic priority, a data size, a capacity, location information, or some combination thereof, and the measurement information includes channel state information, power information, or some combination thereof. In certain embodiments, the apparatus includes a processor that determines a transmission criterion for the second remote unit, wherein the transmitter transmits the transmission criterion to the second remote unit. In some embodiments, the transmission criterion is received by the second remote unit and used by the second remote unit to determine whether to transmit the second message to the apparatus.

A method for transmitting a message in response to receiving a message, in one embodiment, includes receiving a second message from a second remote unit. In such an embodiment, the second message is transmitted from the second remote unit in response to the second remote unit receiving a first message from a first remote unit. In certain embodiments, the method includes transmitting a third message corresponding to the first message in response to receiving the second message.

In one embodiment, an apparatus includes a transmitter that transmits a first message to a second remote unit. In such an embodiment, the second remote unit transmits a second message to a base unit. In various embodiments, the apparatus includes a receiver that receives a third message corresponding to the first message in response to transmitting the first message.

In one embodiment, the receiver receives the third message from the second remote unit, and the second remote unit receives the third message from the base unit. In a further embodiment, the receiver receives the third message from the base unit. In certain embodiments, the first message includes a scheduling request and a fourth message includes control signaling to schedule sidelink communication. In some embodiments, the first message includes a scheduling request and the third message includes control signaling to schedule sidelink communication. In one embodiment, the first message includes data and the third message is transmitted from the second remote unit and includes feedback corresponding to the data.

In some embodiments, the first message includes data and the third message is transmitted from the base unit and includes feedback corresponding to the data. In certain embodiments, the first message includes a scheduling request. In various embodiments, the scheduling request includes a traffic type, a traffic priority, a data size, a capacity, location information, or some combination thereof.

A method for transmitting a message in response to receiving a message, in one embodiment, includes transmitting a first message to a second remote unit. In such an embodiment, the second remote unit transmits a second message to a base unit. In some embodiments, the method includes receiving a third message corresponding to the first message in response to transmitting the first message.

In one embodiment, an apparatus includes a receiver that receives a first message from a first remote unit. In various embodiments, the apparatus includes a processor that generates measurement information, and determines whether a transmission criterion is satisfied based on the first message, measurement information, or some combination thereof. In some embodiments, the apparatus includes a transmitter that transmits a second message to a base unit in response to the transmission criterion being satisfied. In certain embodiments, the apparatus includes a receiver that receives a third message from the base unit corresponding to the first message in response to transmitting the second message.

In one embodiment, the transmitter transmits a fourth message to the first remote unit. In such an embodiment, the fourth message includes control signaling to schedule the sidelink communication, feedback corresponding to data, or some combination thereof. In a further embodiment, the second message includes data, a scheduling request, the measurement information, or some combination thereof, and the third message includes control signaling to schedule sidelink communication, feedback corresponding to the data, the scheduling request, the measurement information, or some combination thereof. In certain embodiments, the second message includes data and the third message includes feedback corresponding to the data. In some embodiments, the second message includes data, a scheduling request, the measurement information, or some combination thereof. In one embodiment, the measurement information includes channel state information, measured power information, or some combination thereof.

In some embodiments, the scheduling request includes a traffic type, a traffic priority, a data size, a capacity, location information, or some combination thereof. In certain embodiments, the transmission criterion is preconfigured by the base unit to configure the second remote unit to determine whether the second remote unit transmits the second message, the measurement information, or some combination thereof to the base unit.

A method for transmitting a message in response to receiving a message, in one embodiment, includes receiving a first message from a first remote unit. In some embodiments, the method includes generating measurement information. In certain embodiments, the method includes determining whether a transmission criterion is satisfied based on the first message, measurement information, or some combination thereof. In various embodiments, the method includes transmitting a second message to a base unit in response to the transmission criterion being satisfied. In one embodiment, the method includes receiving a third message from the base unit corresponding to the first message in response to transmitting the second message.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
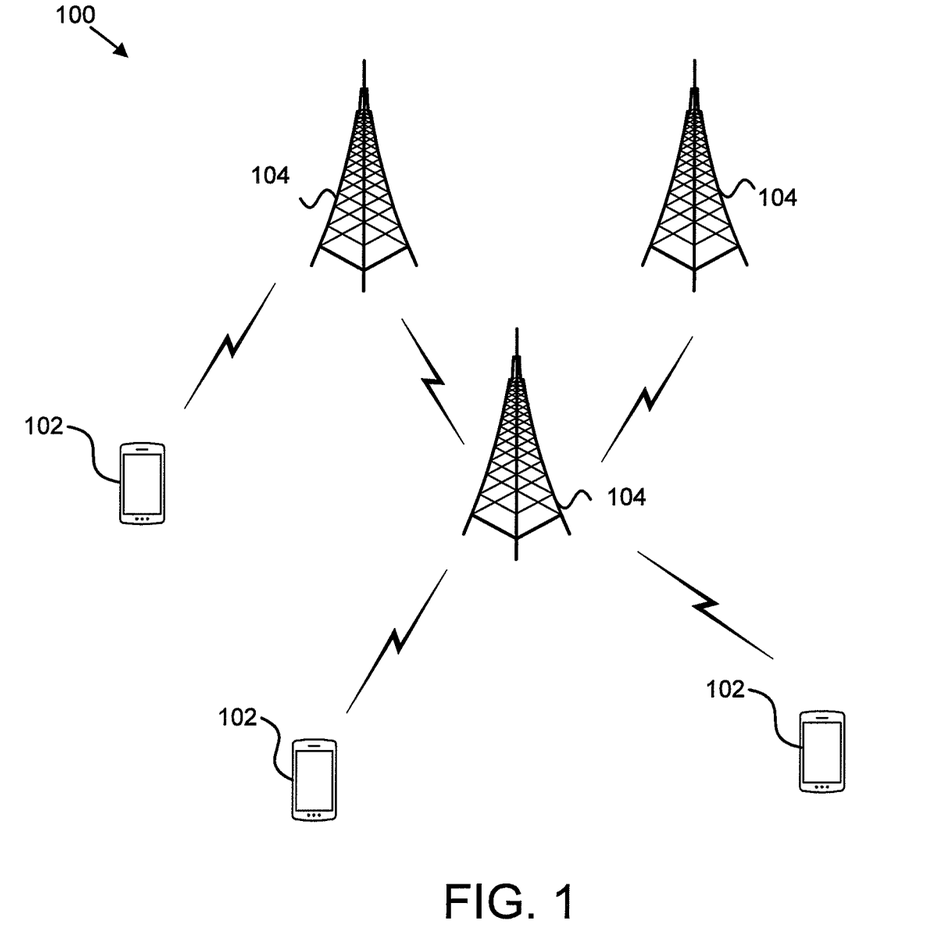
FIG. 1 is a schematic block diagram illustrating one embodiment of a wireless communication system for transmitting a message in response to receiving a message.

FIG. 1 depicts an embodiment of a wireless communication system 100 for transmitting a message in response to receiving a message. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may transmit a first message to a second remote unit 102. In such an embodiment, the second remote unit 102 may transmit a second message to a base unit 104. In some embodiments, the remote unit 102 may receive a third message corresponding to the first message in response to transmitting the first message. Accordingly, a remote unit 102 may be used for transmitting a message in response to receiving a message.

In some embodiments, a remote unit 102 may receive a first message from a first remote unit 102. In some embodiments, the remote unit 102 may generate measurement information. In certain embodiments, the remote unit 102 may determine whether a transmission criterion is satisfied based on the first message, measurement information, or some combination thereof. In various embodiments, the remote unit 102 may transmit a second message to a base unit 104 in response to the transmission criterion being satisfied. In one embodiment, the remote unit 102 may receive a third message from the base unit 104 corresponding to the first message in response to transmitting the second message. Accordingly, a remote unit 102 may be used for transmitting a message in response to receiving a message.

In certain embodiments, a base unit 104 may receive a second message from a second remote unit. In such embodiments, the second message may be transmitted from the second remote unit in response to the second remote unit receiving a first message from a first remote unit. In certain embodiments, the base unit 104 may transmit a third message corresponding to the first message in response to receiving the second message. Accordingly, a base unit 104 may be used for transmitting a message in response to receiving a message.

Figure 2:
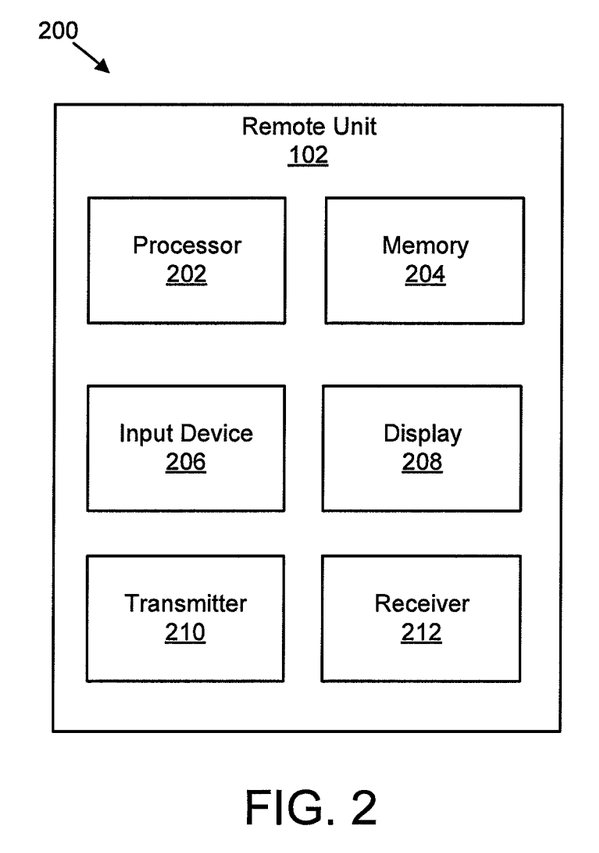
FIG. 2 is a schematic block diagram illustrating one embodiment of an apparatus that may be used for transmitting a message in response to receiving a message.

FIG. 2 depicts one embodiment of an apparatus 200 that may be used for transmitting a message in response to receiving a message. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may generate measurement information. In various embodiments, the processor 202 may determine whether a transmission criterion is satisfied based on the first message, measurement information, or some combination thereof. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to transmissions. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In certain embodiments, the transmitter 210 may be used to a first message to a second remote unit 102. In such embodiments, the second remote unit 102 transmits a second message to a base unit 104. In some embodiments, the receiver 212 may be used to receive a third message corresponding to the first message in response to transmitting the first message. In certain embodiments, the receiver 212 may be used to receive a first message from a first remote unit 102. In various embodiments, the transmitter 210 may be used to transmit a second message to a base unit 104 in response to the transmission criterion being satisfied. In one embodiment, the receiver 212 may be used to receive a third message from the base unit 104 corresponding to the first message in response to transmitting the second message. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
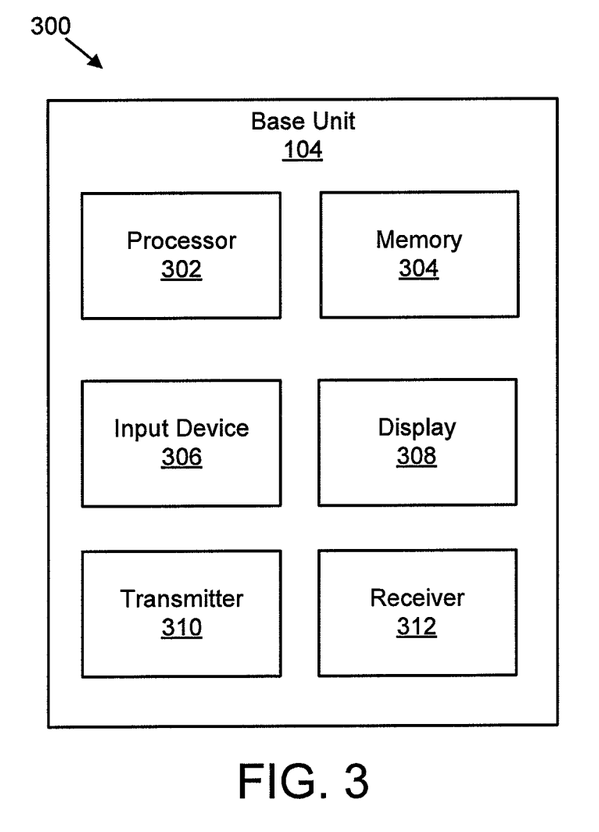
FIG. 3 is a schematic block diagram illustrating one embodiment of an apparatus that may be used for transmitting a message in response to receiving a message.

FIG. 3 depicts one embodiment of an apparatus 300 that may be used for transmitting a message in response to receiving a message. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the receiver 312 is used to receive a second message from a second remote unit 102. In such an embodiment, the second message is transmitted from the second remote unit 102 in response to the second remote unit 102 receiving a first message from a first remote unit 102. In certain embodiments, the transmitter 310 is used to transmit a third message corresponding to the first message in response to receiving the second message. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
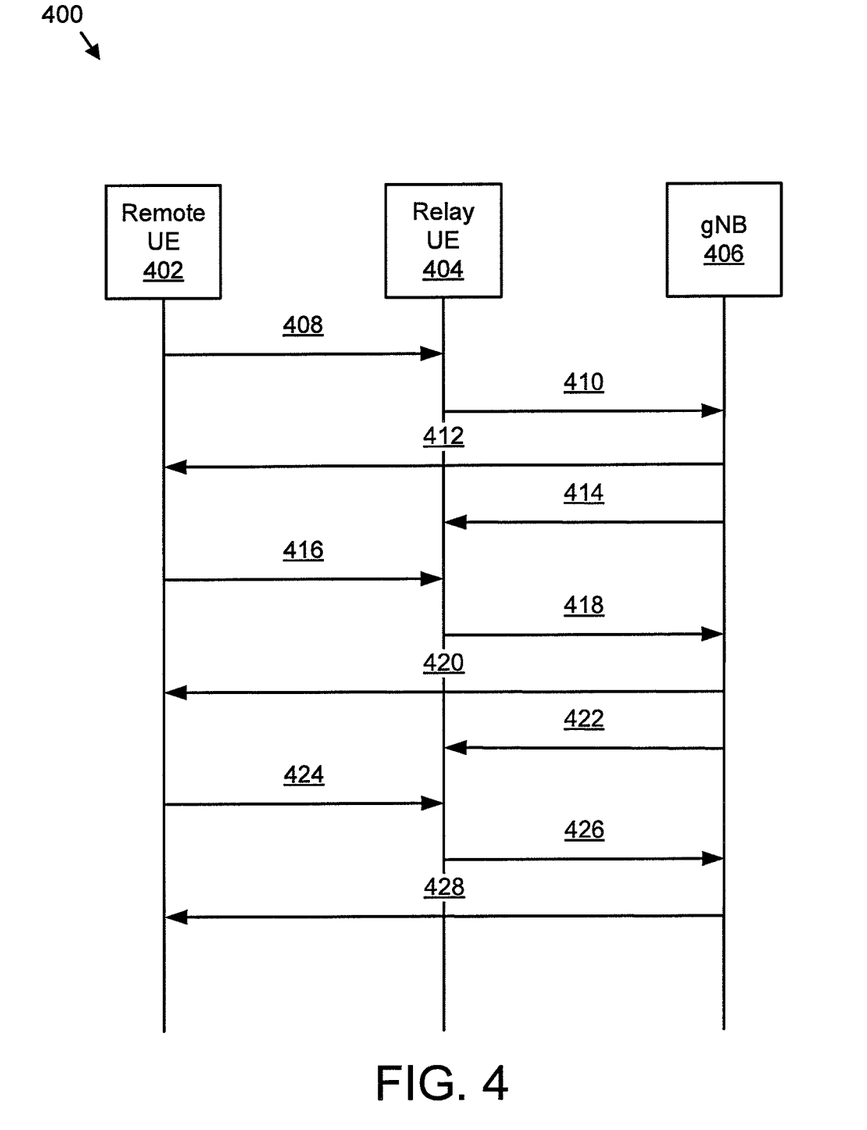
FIG. 4 illustrates one embodiment of communications for transmitting a message in response to receiving a message.

FIG. 4 illustrates one embodiment of communications 400 for transmitting a message in response to receiving a message. Communications 400 between a remote UE 402, a relay UE 404, and a gNB 406 are illustrated.

In certain embodiments, a resource pool may be configured and/or preconfigured by the gNB 406 for the remote UE 402 to transmit its data in a sidelink mode and the resource pool may also be configured and/or preconfigured by the gNB 406 for the relay UE 404 to receive data transmitted from the remote UE 402 in sidelink mode.

In some embodiments, a first communication 408 may be transmitted from the remote UE 402 to the relay UE 404. The first communication 408 may include generated data, a SR, and/or measurement information.

In various embodiments, the first communication 408 may be transmitted from the remote UE 402 to the relay UE 404 using a preconfigured resource pool. In some embodiments, an SR may be transmitted on a sidelink in a scheduling assignment ("SA") and/or a data part. In various embodiments, the SR may include a traffic type, a traffic priority, a data size (e.g., size of generated data), a capacity, and/or location information. In certain embodiments, a traffic type of generated data may include transmission control protocol ("TCP") traffic and/or voice over internet protocol ("VoIP") traffic. In some embodiments, TCP traffic may include a file transfer. In various embodiments, TCP traffic may facilitate transmission accuracy corresponding to an acknowledgement mode ("AM") mode in a radio link control ("RLC") layer. In certain embodiments, TCP traffic may be generated by an NB-IoT UE. In one embodiment, VoIP traffic may include a voice call. In some embodiments, VoIP traffic may facilitate delay tolerance corresponding to an unacknowledged mode ("UM") mode in an RLC layer. In certain embodiments, VoIP traffic may be generated by a wearable UE. In various embodiments, a capacity of the remote UE 402 may be, for example, whether the remote UE 402 supports unidirectional transmission to the relay UE 404 and/or bidirectional transmission to the relay UE 404. In some embodiments, remote UE 402 location information may indicate, for example, whether the remote UE 402 is in coverage of the gNB 406, in coverage of the gNB 406 in control element ("CE") mode, out of coverage of the gNB 406, and so forth, In certain embodiments, a second communication 410 may be transmitted from the relay UE 404 to the gNB 406. The second communication 410 may include data information based on reported information of the remote UE 402 on UL transmission. In some embodiments, if the relay UE 404 is preconfigured to decode sidelink data from the remote UE 402 and feedback ACK/NACK to the remote UE 402 by itself, the relay UE 404 doesn't need to report the information to the gNB 406, as described in relation to FIG. 5.

In various embodiments, the gNB 406 receives data information corresponding to the remote UE 402 and reported by the relay UE 404, and then determines a transmission procedure and ACK/NACK feedback based on the traffic type, the traffic priority, the data size, the capacity, and/or the location information of the remote UE 402.

In some embodiments, in response to the gNB 406 being informed by data information that the remote UE 402 supports unidirectional transmission to the relay UE 404, the traffic type of the remote UE 402 generated data is VoIP, and/or the remote UE 402 is in coverage of the gNB 406 with and/or without CE technology, communications may occur as illustrated in FIG. 4.

In one embodiment, in a third communication 412 from the gNB 406 to the remote UE 402, the gNB 406 transmits a first DCI format (e.g., first UL grant) to the remote UE 402 on a subframe n. In some embodiments, in a fourth communication 414 from the gNB 406 to the relay UE 404, the gNB 406 transmits a second DCI format (e.g., second UL grant) to the relay UE 404 on a subframe n'. In various embodiments, n may be equal to n'.

In certain embodiments, the first DCI format includes an indicator to indicate to the remote UE 402 to transmit data on a scheduled resource or to activate the remote UE 402 to transmit data to the relay UE 404 on a subframe n+a.

In some embodiments, the second DCI format includes: an indicator to indicate to the relay UE 404 to receive the transmission from the remote UE 402 via sidelink on the subframe n+a using a time/frequency resource of the remote UE 402; and an indicator to indicate to the relay UE 404 to transmit the received data from the remote UE 402 to the gNB 406 on subframe n'+b.

In various embodiments, in a fifth communication 416 transmitted from the remote UE 402 to the relay UE 404, the remote UE 402 transmits data to the relay UE 404 using the subframe n+a.

In certain embodiments, in a sixth communication 418 transmitted from the relay UE 404 to the gNB 406, the gNB 406 receives a transmission from the relay UE 404 on the subframe n'+b, and the gNB 406 decodes the received data.

In response to the gNB 406 not successfully decoding the data, in a seventh communication 420 transmitted from the gNB 406 to the remote UE 402, the gNB 406 transmits the first DCI format (e.g., third UL grant) to the remote UE 402 in a subframe m, and in an eighth communication 422 transmitted from the gNB 406 to the relay UE 404, the gNB 406 transmits the second DCI format (e.g., fourth UL grant) to the relay UE 404 in a subframe m'. In one embodiment, a data indicator and process number are used to indicate in the first and/or second DCI formats that the UL grant is for a retransmission. In certain embodiments, MCS, transmit power control ("TPC"), and/or time/frequency resource may be changed in DCI.

In various embodiments, in a ninth communication 424 transmitted from the remote UE 402 to the relay UE 404, the remote UE 402 retransmits data to the relay UE 404 using the subframe m+c. In certain embodiments, in a tenth communication 426 transmitted from the relay UE 404 to the gNB 406, the gNB 406 receives a transmission from the relay UE 404 on the subframe m'+c, and the gNB 406 decodes the received data. In some embodiments, the seventh, eighth, ninth, and tenth communications 420, 422, 424, and 426 may be repeated until the remote UE 402 receiving an ACK or a maximum predefined or preconfigured number of retransmissions is reached.

In response to the gNB 406 decoding the data successfully, in an eleventh communication 428 transmitted from the gNB 406 to the remote UE 402, the gNB 406 transmits an ACK to the remote UE 402 on subframe k. In some embodiments, the timing between n+a (or m+c) and k may be predefined or indicated in DCI. After the eleventh communication 428, the transmission may be complete.

Figure 5:
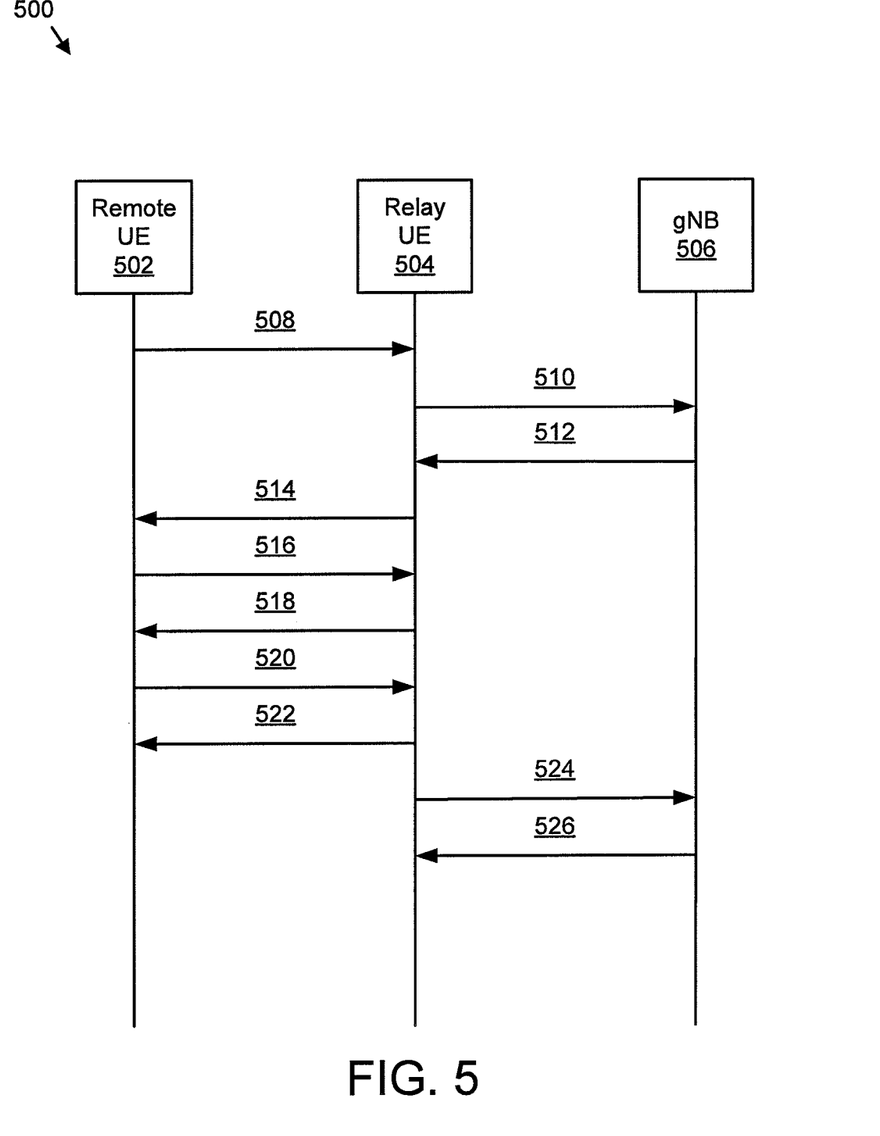
FIG. 5 illustrates another embodiment of communications for transmitting a message in response to receiving a message.

FIG. 5 illustrates another embodiment of communications 500 for transmitting a message in response to receiving a message. Communications 500 between a remote UE 502, a relay UE 504, and a gNB 506 are illustrated.

In certain embodiments, a resource pool may be configured and/or preconfigured by the gNB 506 for the remote UE 502 to transmit its data in a sidelink mode and the resource pool may also be configured and/or preconfigured by the gNB 506 for the relay UE 504 to receive data transmitted from the remote UE 502 in sidelink mode.

In some embodiments, a first communication 508 may be transmitted from the remote UE 502 to the relay UE 504. The first communication 508 may include generated data, a SR, and/or measurement information.

In various embodiments, the first communication 508 may be transmitted from the remote UE 502 to the relay UE 504 using a preconfigured resource pool. In some embodiments, an SR may be transmitted on a sidelink in a scheduling assignment ("SA") and/or a data part. In various embodiments, the SR may include a traffic type, a traffic priority, a data size (e.g., size of generated data), a capacity, and/or location information. In certain embodiments, a traffic type of generated data may include transmission control protocol ("TCP") traffic and/or voice over internet protocol ("VoIP") traffic. In some embodiments, TCP traffic may include a file transfer. In various embodiments, TCP traffic may facilitate transmission accuracy corresponding to an acknowledgement mode ("AM") mode in a radio link control ("RLC") layer. In certain embodiments, TCP traffic may be generated by an NB-IoT UE. In one embodiment, VoIP traffic may include a voice call. In some embodiments, VoIP traffic may facilitate delay tolerance corresponding to an unacknowledged mode ("UM") mode in an RLC layer. In certain embodiments, VoIP traffic may be generated by a wearable UE. In various embodiments, a capacity of the remote UE 502 may be, for example, whether the remote UE 502 supports unidirectional transmission to the relay UE 504 and/or bidirectional transmission to the relay UE 504. In some embodiments, remote UE 502 location information may indicate, for example, whether the remote UE 502 is in coverage of the gNB 506, in coverage of the gNB 506 in CE mode, out of coverage of the gNB 506, and so forth, In certain embodiments, a second communication 510 may be transmitted from the relay UE 504 to the gNB 506. The second communication 510 may include data information based on reported information of the remote UE 502 on UL transmission. In some embodiments, the gNB 506 receives data information corresponding to the remote UE 502 and reported by the relay UE 504, and then determines a transmission procedure and ACK/NACK feedback based on the traffic type, the traffic priority, the data size, the capacity, and/or the location information of the remote UE 502. In various embodiments, a third communication 512 may be transmitted from the gNB 506 to the relay UE 504 indicating the determined transmission procedure and an UL grant to the relay UE 504. In some embodiments, if the relay UE 504 is preconfigured to decode sidelink data from the remote UE 502 and feedback ACK/NACK to the remote UE 502 by itself, the relay UE 504 doesn't need to report the information to the gNB 506. In such embodiments, the second communication 510 and the third communication 512 may not be performed.

In response to the gNB 506 being informed from the reported information that the remote UE 502 supports bidirectional transmission to the relay UE 504, the traffic type of the remote UE 502 generated data is file transfer protocol ("FTP"), and/or if the relay UE 504 is preconfigured to autonomously control the sidelink transmission/resource allocation (e.g., decode the sidelink data and feedback ACK/NACK to remote by itself), communications may occur as illustrated in FIG. 5.

In a fourth communication 514 transmitted from the relay UE 504 to the remote UE 502, the relay UE 504 sends a SL scheduling grant on subframe n+a to the remote UE 502 to indicate to the remote UE 502 to transmit data on a subframe n+b. In a fifth communication 516 transmitted from the remote UE 502 to the relay UE 504, the remote UE 502 transmits data to the relay UE 504 on the subframe n+b.

In response to the relay UE 504 failing to receive and/or decode the data on subframe n+b, in a sixth communication 518 transmitted from the relay UE 504 to the remote UE 502, the relay UE 504 transmits a new SL scheduling grant or a NACK on subframe n+c to the remote UE 502 to indicate to the remote UE 502 to schedule/trigger a data retransmission on a subframe n+d. In a seventh communication 520 transmitted from the remote UE 502 to the relay UE 504, the remote UE 502 retransmits data to the relay UE 504 on the subframe n+d. The sixth and seventh communications 518 and 520 may be repeated until the relay UE 504 receives and decodes the data.

In response to the relay UE 504 receiving and decoding the data on subframe n+d (or subframe n+b), in an eighth communication 522 transmitted from the relay UE 504 to the remote UE 502, the relay UE 504 provides ACK feedback to the remote UE 502. In a ninth communication 524 transmitted from the relay UE 504 to the gNB 506, the data is transmitted from the relay UE 504 to the gNB 506. Moreover, in a tenth communication 526 transmitted from the gNB 506 to the relay UE 504, the gNB 506 transmits an ACK if data is received correctly. If data is not received correctly, the ninth communication 524 is repeated with a retransmission until an ACK is received.

Figure 6:
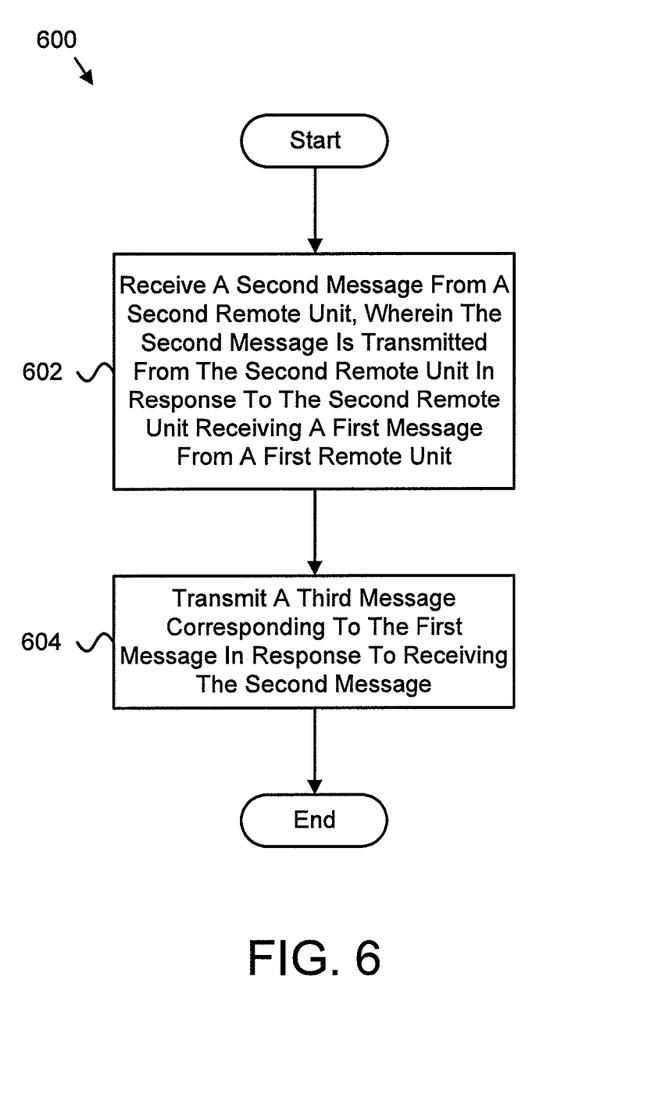
FIG. 6 is a schematic flow chart diagram illustrating one embodiment of a method for transmitting a message in response to receiving a message.

FIG. 6 is a schematic flow chart diagram illustrating one embodiment of a method 600 for transmitting a message in response to receiving a message. In some embodiments, the method 600 is performed by an apparatus, such as the base unit 104. In certain embodiments, the method 600 may be performed by a processor executing program code, for example, a microcontroller, a microprocessor, a CPU, a GPU, an auxiliary processing unit, a FPGA, or the like.

The method 600 may include receiving 602 a second message from a second remote unit. In such an embodiment, the second message may be transmitted from the second remote unit in response to the second remote unit receiving a first message from a first remote unit. In certain embodiments, the method 600 includes transmitting 604 a third message corresponding to the first message in response to receiving the second message.

In one embodiment, the method 600 includes transmitting the third message to the second remote unit, and the second remote unit transmits the third message to the first remote unit. In a further embodiment, the method 600 includes transmitting the third message to the first remote unit. In certain embodiments, the second message includes a scheduling request, measurement information, or a combination thereof, and the third message includes control signaling to schedule sidelink communication. In various embodiments, the second message includes data and the third message includes feedback corresponding to the data. In some embodiments, the second message includes a scheduling request, measurement information, or some combination thereof. In one embodiment, the scheduling request includes a traffic type, a traffic priority, a data size, a capacity, location information, or some combination thereof, and the measurement information includes channel state information, power information, or some combination thereof. In certain embodiments, the method 600 includes determining a transmission criterion for the second remote unit, wherein the transmitter transmits the transmission criterion to the second remote unit. In some embodiments, the transmission criterion is received by the second remote unit and used by the second remote unit to determine whether to transmit the second message to the apparatus.

Figure 7:
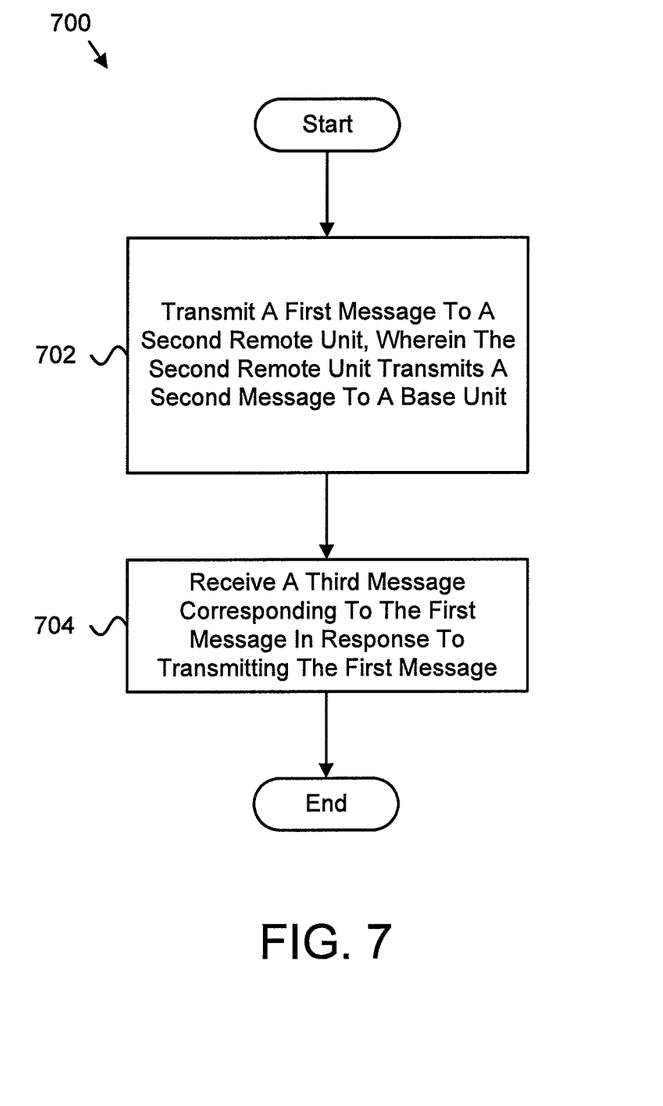
FIG. 7 is a schematic flow chart diagram illustrating another embodiment of a method for transmitting a message in response to receiving a message.

FIG. 7 is a schematic flow chart diagram illustrating another embodiment of a method 700 for transmitting a message in response to receiving a message. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include transmitting 702 a first message to a second remote unit. In such an embodiment, the second remote unit may transmit a second message to a base unit. In some embodiments, the method 700 includes receiving 704 a third message corresponding to the first message in response to transmitting the first message.

In one embodiment, the method 700 includes receiving the third message from the second remote unit, and the second remote unit receives the third message from the base unit. In a further embodiment, the method 700 includes receiving the third message from the base unit. In certain embodiments, the first message includes a scheduling request and a fourth message includes control signaling to schedule sidelink communication. In some embodiments, the first message includes a scheduling request and the third message includes control signaling to schedule sidelink communication. In one embodiment, the first message includes data and the third message is transmitted from the second remote unit and includes feedback corresponding to the data.

In some embodiments, the first message includes data and the third message is transmitted from the base unit and includes feedback corresponding to the data. In certain embodiments, the first message includes a scheduling request. In various embodiments, the scheduling request includes a traffic type, a traffic priority, a data size, a capacity, location information, or some combination thereof.

Figure 8:
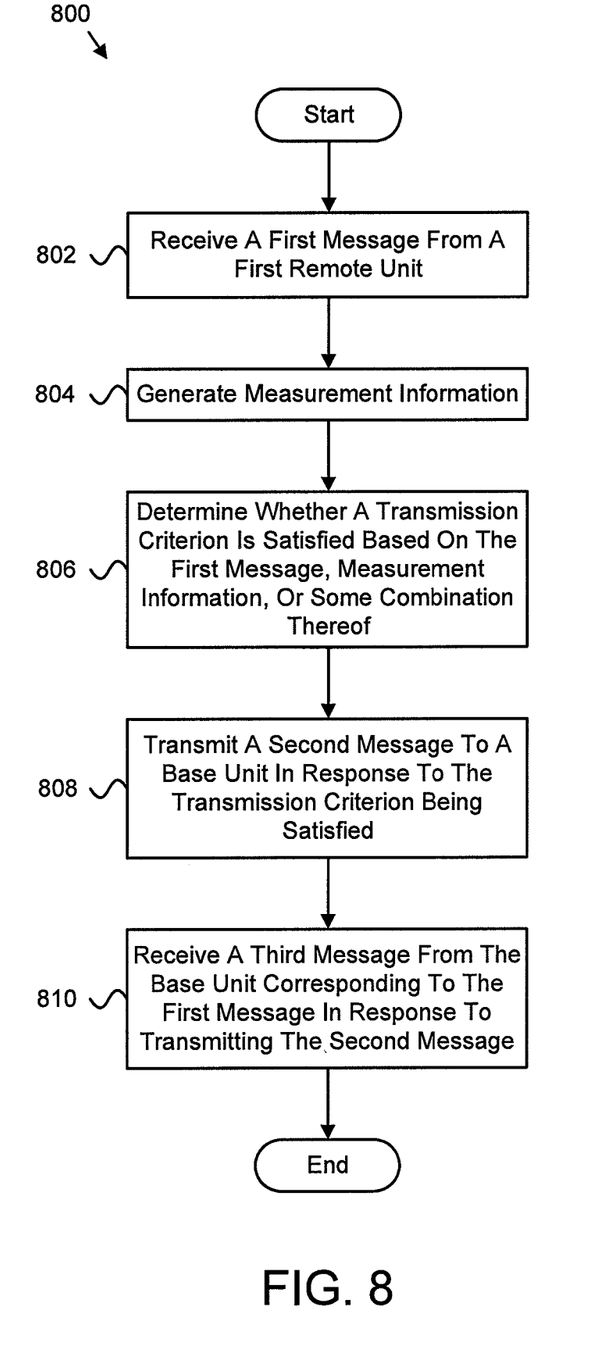
FIG. 8 is a schematic flow chart diagram illustrating a further embodiment of a method for transmitting a message in response to receiving a message.

FIG. 8 is a schematic flow chart diagram illustrating a further embodiment of a method 800 for transmitting a message in response to receiving a message. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include receiving 802 a first message from a first remote unit. In some embodiments, the method 800 includes generating 804 measurement information. In certain embodiments, the method 800 includes determining 806 whether a transmission criterion is satisfied based on the first message, measurement information, or some combination thereof. In various embodiments, the method 800 includes transmitting 808 a second message to a base unit in response to the transmission criterion being satisfied. In one embodiment, the method 800 includes receiving 810 a third message from the base unit corresponding to the first message in response to transmitting the second message.

In one embodiment, the method 800 includes transmitting a fourth message to the first remote unit. In such an embodiment, the fourth message includes control signaling to schedule the sidelink communication, feedback corresponding to data, or some combination thereof. In a further embodiment, the second message includes data, a scheduling request, the measurement information, or some combination thereof, and the third message includes control signaling to schedule sidelink communication, feedback corresponding to the data, the scheduling request, the measurement information, or some combination thereof. In certain embodiments, the second message includes data and the third message includes feedback corresponding to the data. In some embodiments, the second message includes data, a scheduling request, the measurement information, or some combination thereof. In one embodiment, the measurement information includes channel state information, measured power information, or some combination thereof.

In some embodiments, the scheduling request includes a traffic type, a traffic priority, a data size, a capacity, location information, or some combination thereof. In certain embodiments, the transmission criterion is preconfigured by the base unit to configure the second remote unit to determine whether the second remote unit transmits the second message, the measurement information, or some combination thereof to the base unit.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a receiver that receives a second message from a second remote unit, wherein the second message is transmitted from the second remote unit in response to the second remote unit receiving a first message from a first remote unit, and the second message indicates that the second remote unit is a unidirectional relay device or that the second remote unit is a bidirectional relay device; and
a transmitter that transmits a third message corresponding to the first message in response to receiving the second message, wherein transmitting the third message corresponding to the first message in response to receiving the second message comprises:
in response to the second message indicating that the second remote unit is the unidirectional relay device, transmitting the third message directly to the first remote unit; and
in response to the second message indicating that the second remote unit is the bidirectional relay device, transmitting the third message directly to the second remote unit.

2. The apparatus of claim 1, wherein the transmitter transmits the third message to the second remote unit, and the second remote unit transmits the third message to the first remote unit.

3. The apparatus of claim 1, wherein the transmitter transmits the third message to the first remote unit.

4. The apparatus of claim 1, further comprising a processor that determines a transmission criterion for the second remote unit, wherein the transmitter transmits the transmission criterion to the second remote unit.

5. The apparatus of claim 4, wherein the transmission criterion is received by the second remote unit and used by the second remote unit to determine whether to transmit the second message to the apparatus.

6. A method comprising:
receiving a second message from a second remote unit, wherein the second message is transmitted from the second remote unit in response to the second remote unit receiving a first message from a first remote unit, and the second message indicates that the second remote unit is a unidirectional relay device or that the second remote unit is a bidirectional relay device; and
transmitting a third message corresponding to the first message in response to receiving the second message, wherein transmitting the third message corresponding to the first message in response to receiving the second message comprises:
in response to the second message indicating that the second remote unit is the unidirectional relay device, transmitting the third message directly to the first remote unit; and
in response to the second message indicating that the second remote unit is the bidirectional relay device, transmitting the third message directly to the second remote unit.

7. The method of claim 6, wherein the second message comprises a scheduling request, measurement information, or a combination thereof, and the third message comprises control signaling to schedule sidelink communication.

8. The method of claim 6, wherein the second message comprises data and the third message comprises feedback corresponding to the data.

9. The method of claim 6, wherein the second message comprises a scheduling request, measurement information, or some combination thereof.

10. The method of claim 9, wherein the scheduling request comprises a traffic type, a traffic priority, a data size, a capacity, location information, or some combination thereof, and the measurement information comprises channel state information, power information, or some combination thereof.

11. An apparatus comprising:
a transmitter that transmits a first message to a second remote unit, wherein the second remote unit transmits a second message to a base unit, and the second message indicates that the second remote unit is a unidirectional relay device or that the second remote unit is a bidirectional relay device; and
a receiver that receives a third message corresponding to the first message in response to transmitting the first message, wherein receiving the third message corresponding to the first message in response to transmitting the first message comprises:
in response to the second message indicating that the second remote unit is the unidirectional relay device, receiving the third message directly from the base unit; and
in response to the second message indicating that the second remote unit is the bidirectional relay device, receiving the third message directly from the second remote unit.

12. The apparatus of claim 11, wherein the receiver receives the third message from the second remote unit, and the second remote unit receives the third message from the base unit.

13. An apparatus comprising:
a receiver that receives a first message from a first remote unit;
a process that:
generates measurement information; and
determines whether a transmission criterion is satisfied based on the first message, measurement information, or some combination thereof; and
a transmitter that transmits a second message to a base unit in response to the transmission criterion being satisfied, wherein the second message indicates that the apparatus is a unidirectional relay device or that the apparatus is a bidirectional relay device;
wherein the receiver receives a third message from the base unit corresponding to the first message in response to transmitting the second message, wherein receiving the third message corresponding to the first message in response to transmitting the second message comprises:
in response to the second message indicating that the second remote unit is the bidirection relay device, receiving the third message directly from the base unit.

14. The apparatus of claim 13, wherein the transmitter transmits a fourth message to the first remote unit, wherein the fourth message comprises control signaling to schedule the sidelink communication, feedback corresponding to data, or some combination thereof.

15. The apparatus of claim 13, wherein the second message comprises data, a scheduling request, the measurement information, or some combination thereof, and the third message comprises control signaling to schedule sidelink communication, feedback corresponding to the data, the scheduling request, the measurement information, or some combination thereof.

16. The apparatus of claim 13, wherein the second message comprises data and the third message comprises feedback corresponding to the data.

17. The apparatus of claim 13, wherein the second message comprises data, a scheduling request, the measurement information, or some combination thereof.

18. The apparatus of claim 17, wherein the measurement information comprises channel state information, measured power information, or some combination thereof.

19. The apparatus of claim 17, wherein the scheduling request comprises a traffic type, a traffic priority, a data size, a capacity, location information, or some combination thereof.

20. The apparatus of claim 13, wherein the transmission criterion is preconfigured by the base unit to configure the second remote unit to determine whether the second remote unit transmits the second message, the measurement information, or some combination thereof to the base unit.

* * * * *